United States Patent [19]

Sato

[11] Patent Number: 4,745,596
[45] Date of Patent: May 17, 1988

[54] MULTIPLEX COMMUNICATION SYSTEM

[75] Inventor: Morio Sato, Yokohama, Japan

[73] Assignee: Honda Giken Kogyo Kabushiki Kaisha, Japan

[21] Appl. No.: 884,539

[22] Filed: Jul. 11, 1986

[30] Foreign Application Priority Data

Jul. 16, 1985 [JP] Japan .................................. 60-157807
Mar. 8, 1986 [JP] Japan .................................. 61-50773
Mar. 8, 1986 [JP] Japan .................................. 61-50775

[51] Int. Cl.⁴ .............................................. H04J 3/02
[52] U.S. Cl. .................................. 370/85; 340/825.51
[58] Field of Search ................. 370/85, 86; 340/825.5, 340/825.51; 371/67, 71

[56] References Cited

U.S. PATENT DOCUMENTS 3,796,992  3/1974  Nakamura et al. ................. 340/147
4,063,220  12/1977  Metcalfe et al. .................... 340/147
4,602,364  7/1986  Herman et al. ....................... 370/85
4,641,307  2/1987  Russell ................................. 370/85
4,658,250  4/1987  Nering et al. ......................... 370/85

FOREIGN PATENT DOCUMENTS 53-123601  10/1978  Japan .
56-28541   3/1981  Japan .
1494240   12/1977  United Kingdom .

Primary Examiner—Douglas W. Olms
Assistant Examiner—Frank M. Scutch, III
Attorney, Agent, or Firm—Darby & Darby

[57] ABSTRACT

A multiplex communication system suitable for use in a vehicle is disclosed. The system comprises a single signal line and a plurality of nodes or communication units connected to the single signal line. Each node is assigned a specific node address and has a microcomputer which includes a transceiver section connected to the signal line for outputting data in the form of a start-stop signal thereto and for receiving data therefrom. The data outputted from each node includes source address data representative of the specific node address of a respective one of the nodes and destination address data representative of the specific node address of one of the nodes to which the data is to be transmitted. Each of the nodes stores the data received from the signal line when the destination address data included in the received data coincides with the node address thereof. The transceiver sections of the nodes cooperate with the signal line to form a preferential circuit wherein one of two signal levels of each of the start-stop signals simultaneously outputted onto the signal line has a priority over the other of the two signal levels. The microcomputer of each of the nodes is so programmed as to compare the data outputted from the transceiver section thereof with the received data bit by bit to detect a collision of data on the signal line when the two data differs from each other. Each of the nodes stops the output of data when the collision of data is detected.

9 Claims, 12 Drawing Sheets

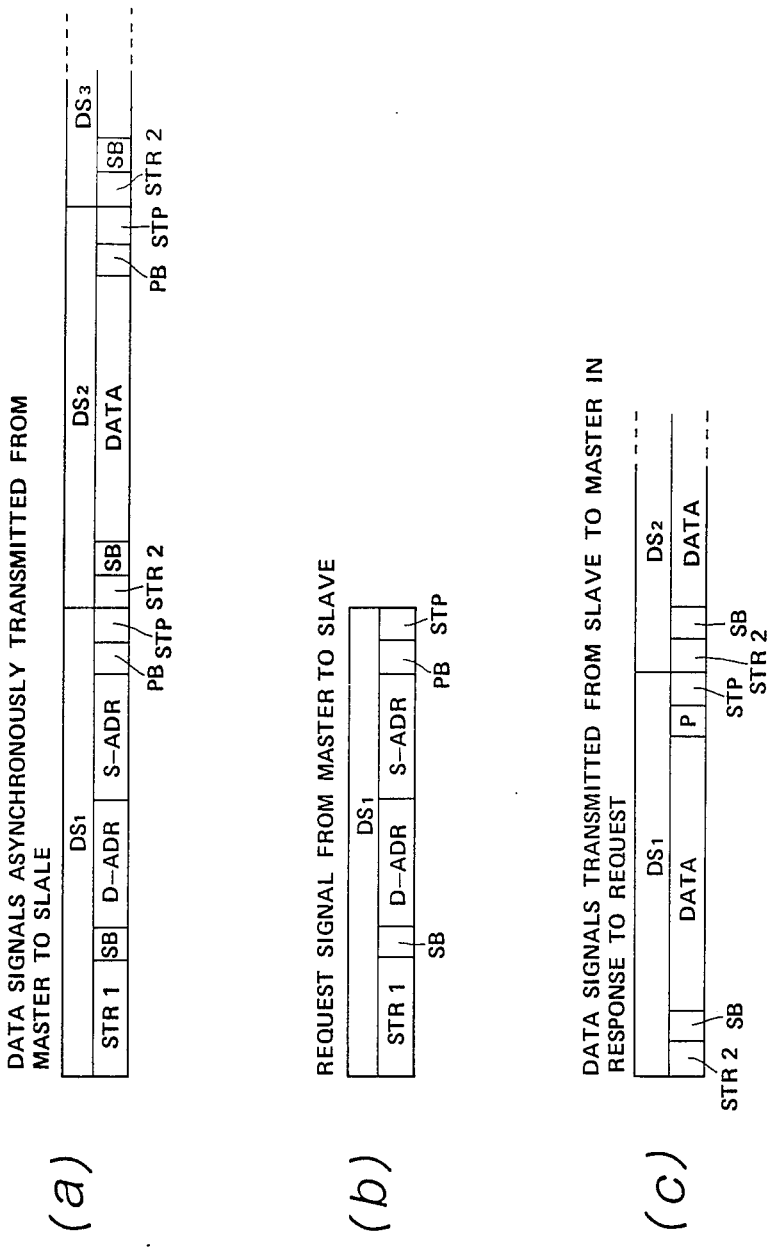

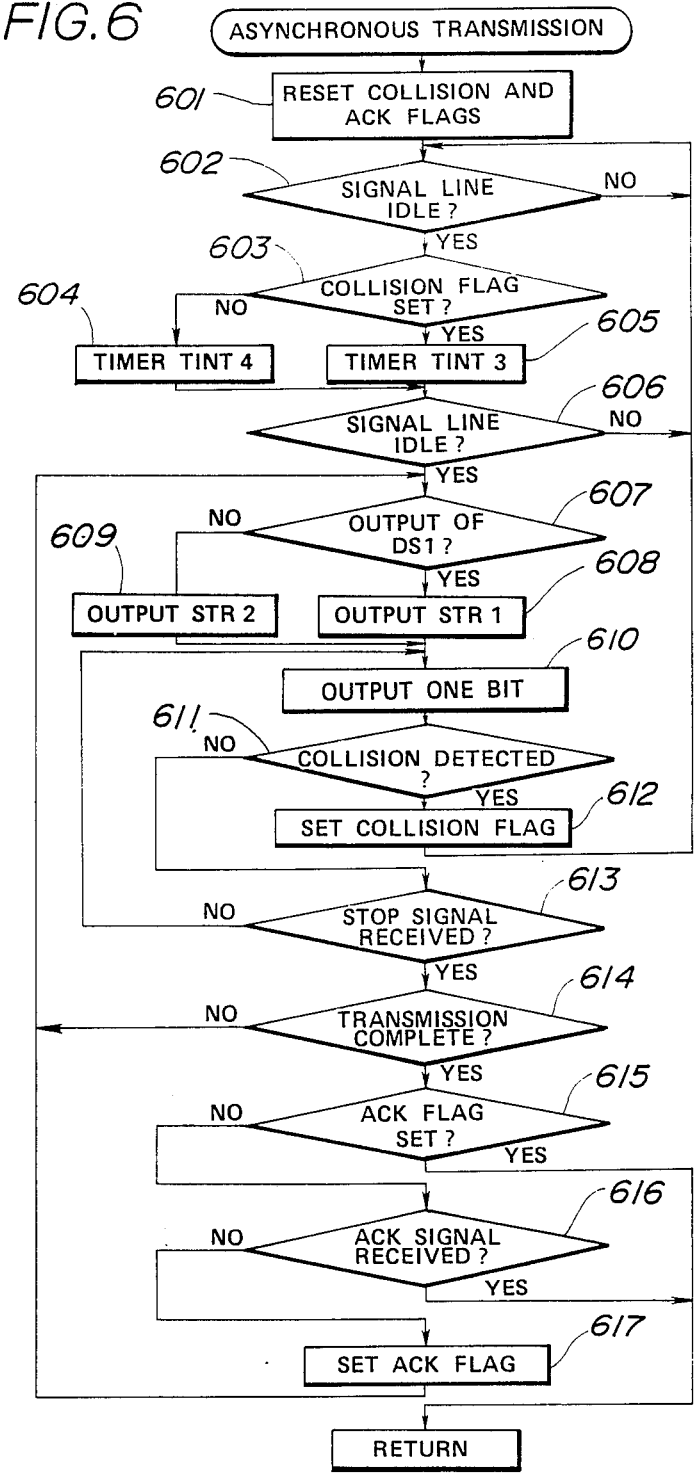

MULTIPLEX COMMUNICATION SYSTEM

BACKGROUND OF THE INVENTION

1. Field of the Invention

This invention relates to a multiplex communication system for use in a vehicle such as a motorcycle.

2. Prior Art

It is preferred that a transmitter and receiver system to be installed on a vehicle should be simple in construction and lightweight. For this reason, it has been proposed to reduce, as much as possible, the number of communication lines connecting a plurality of transmitter and/or receiver units (or nodes) together. Examples of such conventional communication systems includes (i) one in which a single communication line, such as an optical fiber cable and a coaxial cable, connects each two units together, (ii) one in which a plurality of units are connected together through a single communication line and a single synchronizing signal line, and (iii) one in which a plurality of units are connected together through a single communication line and a plurality of address lines.

In such conventional communication systems, however, the signal lines used are not utilized fully efficiently, and the arrangement of connection of those signal lines has not yet been simplified to a satisfactory level.

SUMMARY OF THE INVENTION

It is therefore an object of this invention to provide a multiplex communication system of the type in which various transmitter and receiver units (or nodes) can be connected together through a single communication line so as to reduce the overall weight of the communication system.

According to the present invention, there is provided a multiplex communication system comprising a single signal line; and a plurality of nodes connected to the signal line, each node being assigned a specific node address and having transmitting means connected to the signal line for outputting data in the form of a serial binary signal thereto and receiving means connected to the signal line for receiving data in the form of a serial binary signal therefrom, the data outputted from each transmitting means including source address data representative of the specific node address of a respective one of the nodes and destination address data representative of the specific node address of one of the nodes to which the data is to be transmitted, each of the nodes storing the data received from the signal line by a respective one of the receiving means when the destination address data included in the received data coincides with the node address thereof, the transmitting means of the nodes cooperating with the signal line to form a preferential circuit wherein one of two signal levels of each of the binary signals simultaneously outputted onto the signal line has a priority over the other of the two signal levels, each of the nodes having collision detecting means for comparing bit by bit the data outputted from the transmitting means thereof with the data received by the receiving mean thereof to detect a collision of data on the signal line when the two data differs from each other, each of the nodes causing the transmitting means thereof to stop outputting data when the collision of data is detected by the collision detecting means thereof.

BRIEF DESCRIPTION OF THE DRAWINGS

FIG. 4-(a) is an illustration showing the format of the data signals in the asynchronous transmission;

FIG. 4-(b) is an illustration showing the format of the request signal in the synchronous communication;

FIG. 4-(c) is an illustration showing the format of the data signals transmitted in response to the request signal of FIG. 4-(b);

FIG. 6 is a flow chart of the procedure of the asynchronous transmission;

DESCRIPTION OF THE PREFERRED EMBODIMENTS OF THE INVENTION

Figure 1:
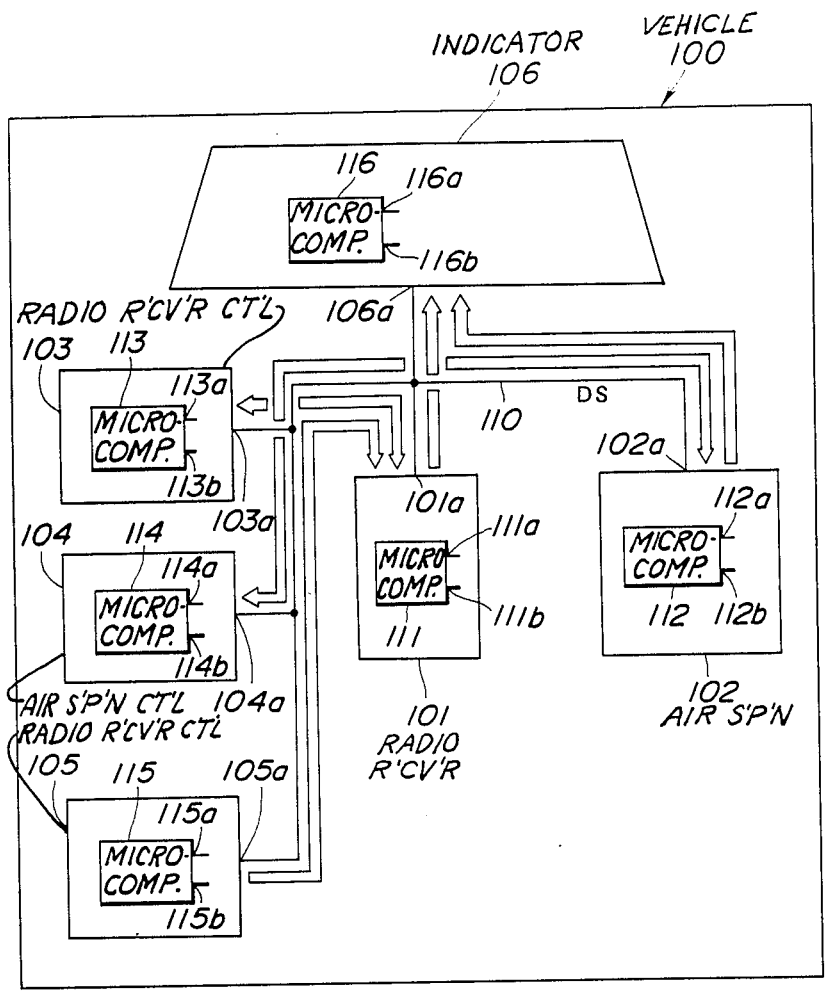
FIG. 1 is a block diagram of a multiplex communication system provided in accordance with the present invention.

FIG. 1 schematically shows a multiplex communication system adapted to be installed on a vehicle 100 such as a motorcycle. The multiplex communication system in the form of a transceiver system comprises a radio receiver unit 101, an air suspension unit 102 for adjusting a road clearance of the vehicle 100, a first radio receiver control switch unit 103 to be operated by a driver or rider of the vehicle 100 for controlling the operation of the radio receiver unit 101, an air suspension control switch unit 104 to be operated by the rider for controlling the operation of the air suspension unit 102, a second radio receiver control switch unit 105 to be operated by a passenger of the vehicle 100 for controlling the operation of the radio receiver unit 101, and an indicator unit 106 indicating the condition of the operation of the radio receiver unit 101 as well as the condition of the operation of the air suspension unit 102.

The above units 101 to 106 have their respective input/output terminals 101a to 106a which are all connected to a common signal line or communication line 110. The transmission of information from one of the above units 101 to 106 to another is effected only through the common signal line 110. Thus, the multiplex communication system can be regarded as a LAN (Local Area Network) for effecting a mutual data transmission from one unit to another.

Figure 2:
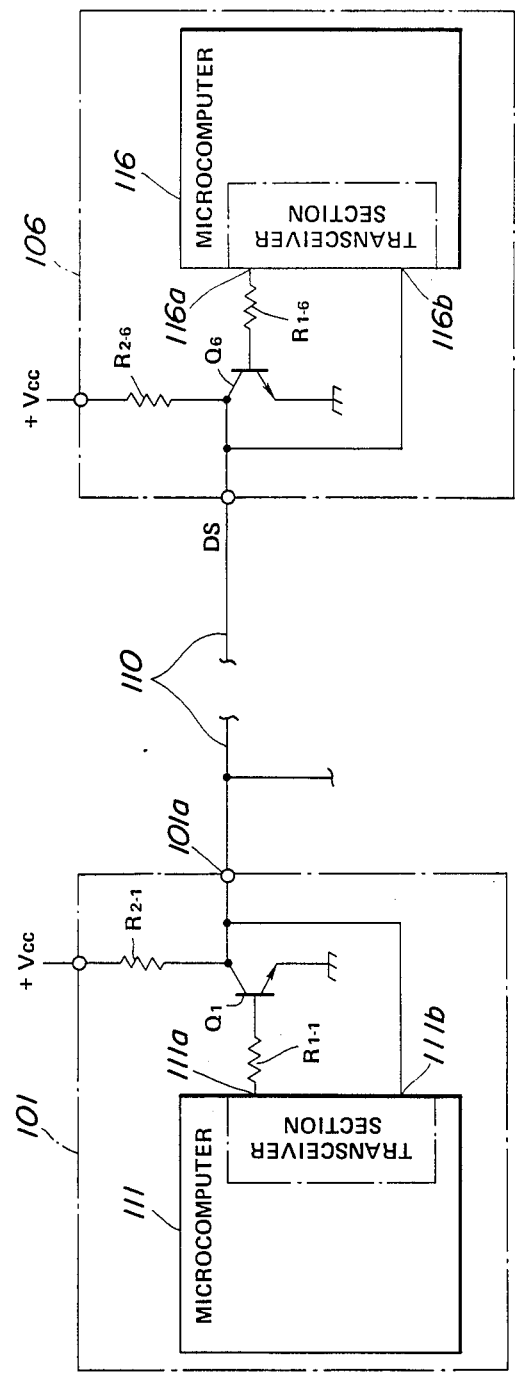
FIG. 2 is a circuit diagram of the respective units and the signal line of the system of FIG. 1.

The above units 101 to 106 have digital microcomputers 111 to 116, respectively, each of which comprises a well-known transceiver section for serially outputting and receiving data signal DS for communication. As shown in FIG. 2, an output terminal 111a of the transceiver section of the microcomputer 111 contained in the radio receiver unit 101 is connected to a base of a transistor $Q_1$ via a resistor $R_{1-1}$, and a collector of the transistor $Q_1$ is connected to the single signal line 110 via the input/output terminal 101a of the unit 101 and is also connected to a source of positive voltage Vcc via a resistor $R_{2-1}$. An input terminal 111b of the transceiver section of the microcomputer 111 is connected to the collector of the transistor $Q_1$, and an emitter of the transistor $Q_1$ is grounded. The other units 102 to 106 are of the same construction as the unit 101.

The operation of the common signal line 110 will now be described.

When the signal at any one of the output terminals 111a to 116a of the microcomputers 111 to 116 is at a high level (H), the signal line 110 is grounded via the transistor Q of one of the units 101 to 106, so that the voltage of the signal line 110 is at a low level (L). And, when the signals at the output terminals 111a to 116a of the microcomputers 101 to 106 are all low (L), the voltage of the signal line 110 is high (H). Thus, with respect to the signal line 110, the low signal level is given a priority over the high signal level. More specifically, when the signal at any one of the input/output terminals 101a to 106a goes low (L), the voltage level of the signal line 110 is caused to go low (L) regardless of the state of the other input/output terminals.

Figure 3:
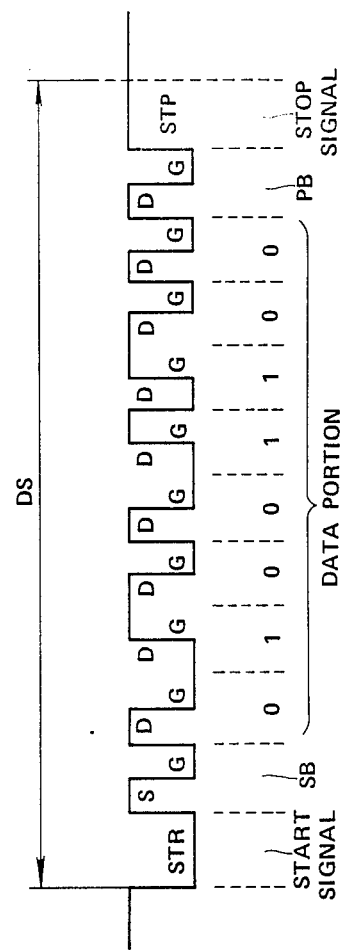
FIG. 3 is an illustration showing the format of the data signal DS outputted from each of the units of FIG. 1.

The data signal DS sent through the signal line 110 will now be described. The data signal DS on the signal line 110 is of the start-stop type, and a format of such data signal DS is shown in FIG. 3. More specifically, the data signal DS includes a low-level start signal STR of 5.5 bits (in the case of the first start signal STR1), a start bit SB composed of a high-level signal S of 0.5 bit followed by a low-level gap G of 0.5 bit, 8-bit data portion, a parity bit PB composed of a parity signal P of 0.5 bit followed by a gap G of 0.5 bit, and a stop signal STP of 1 bit. Thus, the data signal DS is composed of 16.5 bits. The data portion may contain address data or text data, as later described, and each bit of the data portion is composed of 0.5-bit data D and 0.5-bit gap G. In this case, when the data D goes high, the gap G goes low, and vice versa. The reason why each bit of the data portion has 0.5-bit gap G is to enable an instantaneous determination of whether the signal line 110 is busy and an instantaneous determination of whether any collision of signals occurs on the signal line 110, that is to say, access to the signal line 110 is effected by more than one of the units 101 to 106 at the same time, as later described. When another one or more data signals DS are outputted onto the signal line 110 subsequently, these subsequent data signals DS has respective start signals STR of 1 bit (STR2, STR3, . . . ), so that each subsequent data signal DS is composed of 12 bits.

Thus, when the data signal DS is outputted onto the signal line 110, that is to say, the signal line 110 is busy, a time period of the high voltage level (H) of the signal line 110 is one bit time at the maximum. Therefore, whether the signal line 110 is busy can be determined by determining whether the time period of the high voltage level of the signal line 110 is not less than 1.5-bit time. The data portion of the first data signal DS1 contains a destination address data D-ADD representative of an address of the one of the units 101 to 106 which should receive the data signal, and a source address data S-ADD representative of an address of the one of the units 101 to 106 which transmitted the data signal.

In this embodiment, the radio receiver unit 101 and air suspension unit 102 which process a larger amount of data than the other units 103 to 106 serve as master units which dominate the transmission of the data signal from the other units 103 to 106. Thus, the units 103 to 106 serve as slave units. And, the communication between a pair of units is effected through the signal line 110 according to one of the following two procedures:

Transmission of data from a master unit to a slave unit is carried out in accordance with the first procedure of communication. FIG. 4-(a) shows a format of the 1st, 2nd, 3rd, . . . and Nth data signals DS1, DS2, DS3, . . . DSn successively transmitted from the master unit 101, 102 to the slave unit or indicator unit 6, and these data signals DS are sent unilaterally to the indicator unit 6. As shown, the data portion of the first data signal DS1 contains the address data, and the data portions of the second to nth data signals DS2 to DSn contain text data DATA. This transmission is hereinafter referred to as "asynchronous communication".

Referring to the second procedure of communication, the master unit 101 controls the transmission of the data signal DS from the slave units 103 and 105 while the master unit 102 controls the transmission of the data signal DS from the slave unit 104. More specifically, first, the data signal DS or request signal to be transmitted to the slave unit or destination unit 103, 104, 105 and having a data format of FIG. 4-(b) is outputted onto the signal line 110 by the master unit or source unit 101, 102. The data portion of the request signal DS contains the address data composed of destination address D-ADD and source address S-ADD. Then, the microcomputer of the destination slave unit detects the coincidence of the destination address D-ADD, contained in the request signal DS sent from the source or master unit, with the address thereof, and this destination slave unit transmits the successive data signals DS1, DS2 . . . DSn, which has a data format of FIG. 4-(c), to the master unit or source unit designated by the source address contained in the above request signal. As shown, the data portions of the data signals DS1 to DSn contain text data DATA. This communication is hereinafter referred to as "synchronous communication". Thus, the master unit 101 controls the transmission of the data signal DS from the slave units 103 and 105, and the master unit 102 controls the transmission of the data signal DS from the slave unit 104. Therefore, the data signals are not freely sent to the master units 101 and 102 from their respective slave units, so that the processing of the master units 101 and 102 is not interrupted by the data signals from the slave units 103 to 105.

FIGS. 6 to 9 show flow charts of the programs executed by the microcomputers 111 to 116 to perform the transmission of data signals DS in accordance with the aforesaid procedures.

FIG. 6 shows the procedure of the asynchronous communication mentioned above. Each of the microcomputers 111 to 116 comprises storage means, such as a memory and a register, in which a data collision flag and an acknowledge (ACK) flag are provided, the function of these flags being described later. At the beginning of the processing, the collision and ACK flags are reset in Step 601. Then, in Step 602, it is determined whether the signal line 110 is idle (not busy). This determination is made by determining whether the voltage level of the signal line 110 is maintained at a high level for not less than a time period corresponding to 1.5 bits. If the result is "YES", then the processing proceeds to Step 603. On the other hand, if the result is "NO", then this processing is repeated until the result becomes "YES", that is to say, the signal line becomes not busy.

In Step 603, it is determined whether the collision flag is set. If the result is "YES", the processing proceeds to Step 605 to allow a time interval Tint3 to lapse and then proceeds to Step 606. If the result is "NO", then the processing proceeds to Step 604 to allow a time interval Tint4 to lapse and then proceeds to Step 606. In this case, in Step 603, since the collision flag has been reset in Step 601, the result of the initial determination is "NO". The time interval Tint4 is longer than the time interval Tint3 for reasons later described.

In Step 606, it is again determined whether the signal line 110 is idle. If the result is "NO", then the processing returns to Step 602. On the other hand, if the result is "YES", the processing proceeds to Step 607. In Step 607, it is determined whether the data to be transmitted is the first data signal DS1 or not. If the result is "YES", the processing proceeds to Step 608 in which the start signal STR1 is outputted onto the signal line 110. On the other hand, if the result is "NO", the processing proceeds to Step 609 in which the start signal STR2 is outputted onto the signal line 110 (FIG. 4-(a)).

Then, in Step 610, one bit of data is outputted onto the signal line 110, and in Step 611, it is determined whether any data collision occurs on the signal line 110. This determination is carried out by determining whether the data outputted from the microcomputer coincides with the data on the signal line 110, and if such a coincidence is not detected, it is decided that any data collision occurs on the signal line 110. More specifically, as described, with respect to the signal line 110, the low signal level is given a priority over the high signal level. Therefore, if the voltage of the signal line 110 is at the low level when the signal or bit of the high level is sent to the signal line 110, it is considered that one or more of the other units also send the data of low level to the signal line 110, so that the data collision occurs on the signal line 110.

Figure 5:
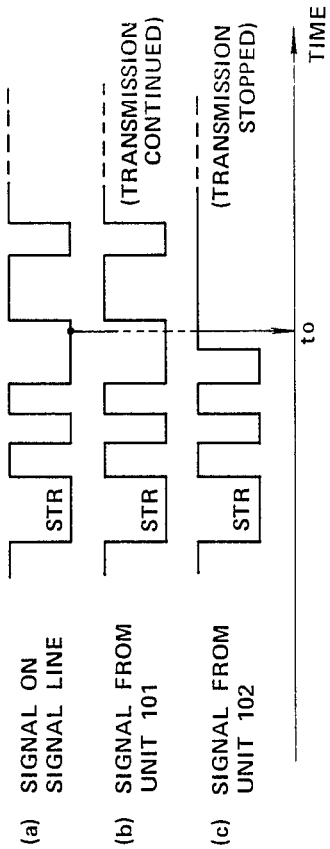
FIG. 5 is a timing chart of two data signals simultaneously outputted from the units 101 and 102 and the signal appearing on the signal line.

For example, as shown in FIG. 5, if the two master units 101 and 102 simultaneously send the data signal DS shown in FIG. 5-(b) and the data signal DS shown in FIG. 5-(c), respectively, these two data signals DS are equal in signal level to the signal on the signal line 110 until time $t_0$. At time $t_0$, the data signal DS from the master unit 101 is at the low level and is therefore given a priority over the data signal DS from the master unit 2 which is now at the high level, so that the voltage level of the signal line 110 is rendered low. Therefore, the master unit 102 detects the noncoincidence of the data signal sent therefrom with the data signal on the signal line 110, thereby deciding a collision of data on the signal line 110.

If the data collision is detected in Step 611, the collision flag is set in Step 612, and the processing returns to Step 602 and waits for the signal line 110 to be idle. In other words, when the collision is detected, the sending of the data signal is stopped until the signal line 110 becomes idle. Then, when it is detected that the signal line 110 becomes idle, the processing proceeds through Step 603, Step 605, Step 606 and Step 607 to Step 608 in which the start signal STR1 of the data signal DS1 is again sent. In this case, since the processing proceeds through Step 605, the time interval between the detection of the idle state of the signal line 110 and the sending of the data signal is the time interval Tint3 and therefore is shorter than the time interval Tint4 before the detection of the collision. The reason is that the data signal DS1 to be sent again is once abandoned, so that the re-transmission of this data signal DS1 is commenced at this time in a shorter period of time.

On the other hand, if no data collision on the signal line 110 is detected, the result in Step 611 is "NO". And, the processing proceeds to Step 613 in which it is determined whether the signal sent to the signal line 110 is the stop signal STP (see FIG. 4-(a)). If the result is "NO", the processing returns to Step 610 in which another bit of data is sent to the signal line 110. This procedure is repeated until the stop signal STP is outputted. Finally, when the stop signal STP is outputted in Step 613, the processing proceeds to Step 614 in which it is determined whether the data signals to be transmitted have all been sent, that is, the transmission of the data signals DS1, DS2, DS3, . . . is completed. If the result is "NO", the processing returns to Step 607, and one or more subsequent data signals DS2, DS3, DS4, . . . DSn are sent to the signal line 110 according to this program. On the other hand, if the result is "YES" in Step 614, the processing proceeds to Step 615 in which it is determined whether the ACK flag is set. If the result is "YES", then the processing is forcibly terminated, and the control of the microcomputer returns to the main routine (not shown). On the other hand, if the result is "NO", the processing proceeds to Step 616 in which it is determined whether an acknowledge signal (ACK) is received. In this case, since the ACK flag is initially reset in Step 601, the result of the initial determination in Step 615 is "NO", and therefore the processing proceeds to Step 616 in the first path. The ACK signal is produced by the destination unit when it properly receives the data signal sent from this source unit.

On the other hand, if the destination unit does not properly receive the data signal sent from this source unit, it does not produce the ACK signal, so that the result in Step 616 is "NO". Therefore, the processing proceeds to Step 617 in which the ACK flag is set. Then, the processing returns to Step 607, and the re-transmitting of the data signal or signals DS1, DS2, . . . DSn is done again. Then, the completion of this re-transmitting is detected in Step 614, and the processing proceeds to Step 615. Since the ACK flag is set immediately before the re-transmitting, the result in Step 615 is "YES", and therefore the processing is terminated. In other words, the re-transmitting is effected only once, so that the signal line 110 is rendered free to enable the access of the other units to the signal line 110. It will be appreciated that the function of the ACK flag is to permit only one re-transmitting of the data signal or signals DS.

The foregoing is the procedure of transmission of the data signal DS by the source unit in the asynchronous communication. Next, the operation of the units other than the source unit (or receiving units) during the asynchronous transmission by the source unit will now be described.

Figure 7:
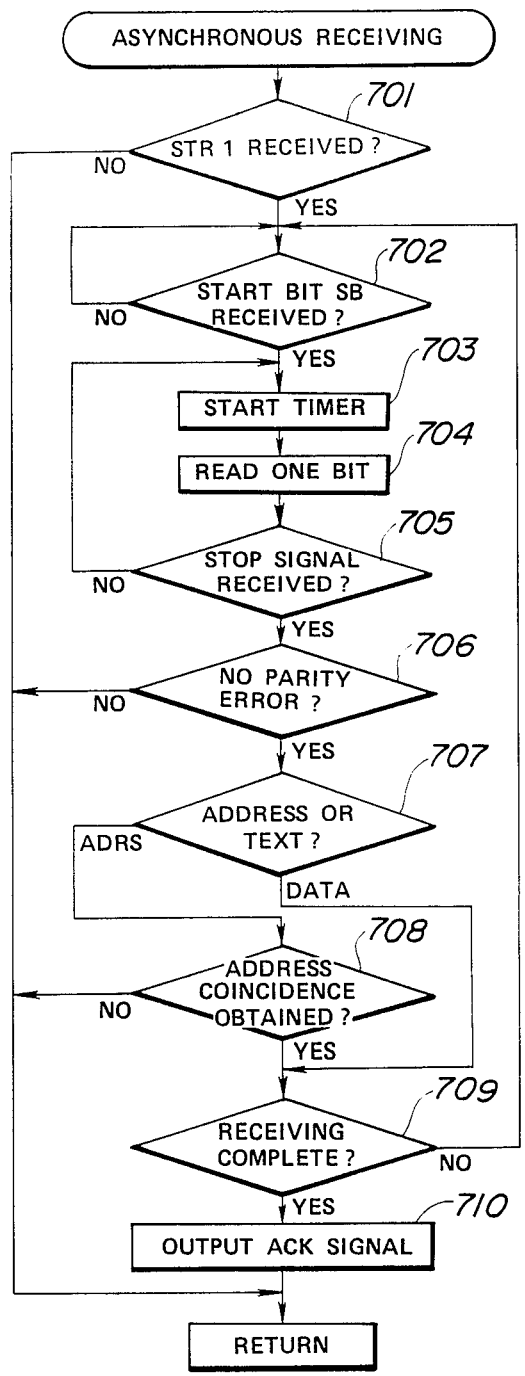
FIG. 7 is a flow chart of the procedure of receiving of the data transmitted in accordance with the procedure of FIG. 6.

FIG. 7 shows the procedure of the operation of each of the receiving units in the asynchronous communication. The operation is performed in accordance with an asynchronous receiving sub-routine executed by the microcomputer of each of the receiving units. In Step 701, it is determined whether the start signal STR1 is received. This determination is made by determining whether the voltage level of the signal line 110 is maintained at a low level for not less than a time period corresponding to 1.5 bits. If the result is "NO", the processing according to this sub-routine is terminated. If the result is "YES", the processing proceeds to Step 702 in which it is determined whether the start bit SB is received. If the result is "NO", this determination is repeated until the start bit SB is received. Thus, after it is determined that the start signal STR1 is received and that the start bit SB is received, start-stop timer means are triggered (Step 703) to set a predetermined time interval after which one bit of the data portion of the data signal DS is stored into memory means associated with the microcomputer.

Then, in Step 705, it is determined whether the stop signal STP of the data signal DS of 16.5 bits or 12 bits is received. If the result is "NO", the processing returns to Step 703, and the processing in Steps 703, 704 and 705 is repeated at the constant time interval determined by the timer means until the stop signal STP is received. Finally, when the result of Step 705 becomes "YES", the processing proceeds to Step 706 in which a parity check is carried out to determine, in the conventional manner, whether there is any error in the data signal so received. If the result is "NO", the processing according to this sub-routine is terminated, and the control of the microcomputer returns to the main routine. On the other hand, if the result in Step 706 is "YES", the processing proceeds to Step 707 in which it is determined whether the received data signal DS contains the address data D-ADD, S-ADD or the text data DATA.

In Step 707, if the received data signal DS is the first data signal DS1, it contains the address data D-ADR and S-ADR as shown in FIG. 4-(a), so that a path indicated by "ADRS" is selected. On the other hand, if the data signal DS in question is one of the subsequent data signals DS2, DS3, . . . DSn, it contains the text data DATA, so that another path indicated by "DATA" is selected. The data signal DS1 and the subsequent data signals can be distinguished from each other based on the lengths of their start signals STR1 AND STR2.

In Step 707, if the path indicated by "ADRS" is selected, the processing proceeds to Step 708 in which it is determined whether the address data D-ADR coincides with the address of this receiving unit. If the result is "NO", the processing is terminated, and the control of the microcomputer returns to the main routine. On the other hand, if the result is "YES", the processing proceeds to Step 709 in which it is determined whether the receiving of the data signal DS is completed. If the result is "NO", the processing returns to Step 702. In Step 707, if the path indicated by "DATA" is selected, the processing proceeds to Step 709.

In Step 709, if the result is "YES", the processing proceeds to Step 710 in which the ACK signal is produced and outputted onto the signal line 110. Now, the processing according to this procedure is completed, and the control of the microcomputer returns to the main routine.

The foregoing is the operation of each receiving unit during the asynchronous communication.

The operation of the synchronous communication mentioned above will now be described with reference to FIGS. 8 and 9.

Figure 8:
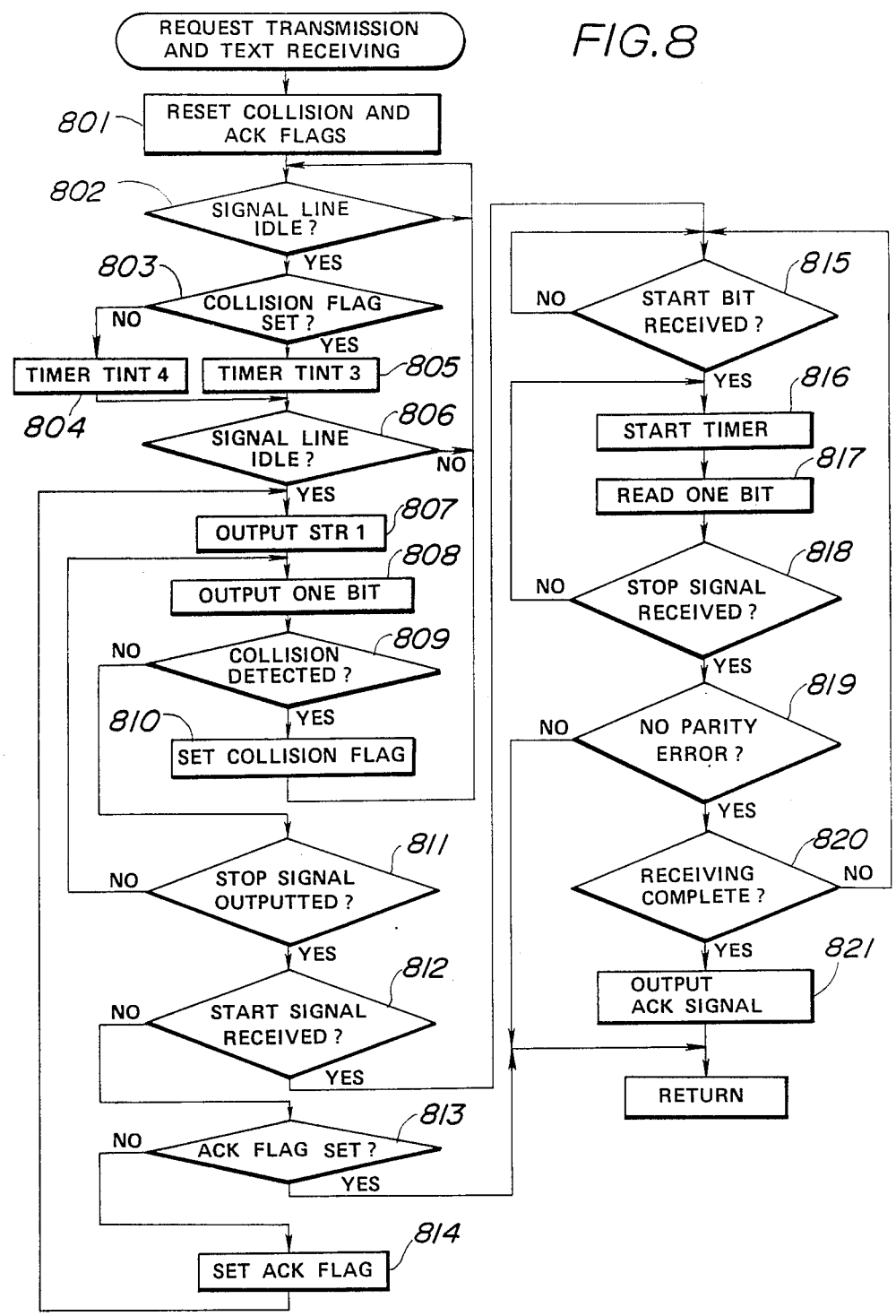
FIG. 8 is a flow chart of the synchronous communication in which the request signal is transmitted.

FIG. 8 shows the procedure of transmission of the request signal from a master unit during the synchronous communication. First, in Step 801, the collision flag and the ACK flag are reset. Then, in Step 802, it is determined whether the signal line 110 is free or not. If the result is "YES", the processing proceeds to Step 803. is determined whether the signal line 110 is free or not. If the result is "YES", the processing proceeds to Step 803. On the other hand, if the result is "NO", this processing is repeated until the result becomes "YES", that is to say, the signal line 110 becomes idle. In Step 803, it is determined whether the collision flag is set. If the result is "NO", the processing proceeds to Step 804 to allow a time interval Tint4 to lapse and then proceeds to Step 806. On the other hand, if the result is "YES", the processing proceeds to Step 805 to allow a time interval Tint3 to lapse and then proceeds to Step 806. The time interval Tint3 is shorter than the time interval Tint4. In Step 806 like in Step 802, it is again determined whether the signal line is free or not. If the result is "YES", the processing proceeds to Step 807. The processing in Steps 801 to 806 is the same as the processing in Steps 601 to 606 of the above-mentioned procedure of the asynchronous communication.

In Step 807, the start signal STR1 (5.5 bits) of the request signal DS1 (FIG. 4-(a)) is sent from the master unit. Then, in Step 808, one bit of the remaining contents of the request signal DS1 is sent. Then, in Step 809, it is determined whether any data collision occurs on the signal line 110. If the result is "YES", the processing proceeds to Step 810 in which the collision flag is set, and then the processing returns to Step 802, so that the above processing from Step 802 to Step 809 is again performed. On the other hand, in Step 809, if the result is "NO", the processing proceeds to Step 811 in which it is determined whether all the bits (16.5 bits) of the request signal DS1 have been sent, that is to say, the stop signal STP is outputted. If the result is "NO", the processing from Step 808 to Step 811 is repeated. The processing from Step 809 to Step 811 is the same as the asynchronous communication processing from step 611 to Step 613 of FIG. 6.

On the other hand, in Step 811, if the result is "YES", the processing proceeds to Step 812 in which it is determined whether the start signal STR2 from the slave unit (destination unit) is received by this master unit (source unit) which has sent the above request signal. If the result is "NO", it is determined whether the ACK flag is in the set state (Step 813), and if the result is "NO", the ACK flag is set (Step 814). Then, the processing from Step 807 to Step 811 is performed again to cause this master unit to send the request signal DS1. In Step 813, if the result is "YES", the processing is terminated.

On the other hand, in Step 812, if the result is "YES", the processing proceeds to Step 815 in which it is determined whether the start bit SB is received by this master unit. If the result is "NO", this processing is repeated until the start bit SB is detected.

In Step 815, if the result is "YES", start-stop timer means is started (Step 816) to set a predetermined time interval after which one bit of the data portion of the received data signal is stored into a memory associated with the microcomputer of this master unit (Step 817).

Then, in Step 818, it is determined whether the stop signal STP of the data signal of 12 bits is received by the master unit. If the result is "NO", the processing from Step 816 to Step 818 is repeated until the stop signal STP is received. Finally, when the result of Step 818 becomes "YES", the processing proceeds to Step 819 in which a parity check is carried out to determine whether there is no error in the data signal so received. If the result is "NO", the processing according to this sub-routine is terminated, and the control of the microcomputer returns to the main routine. On the other hand, if the result is "YES", the processing proceeds to Step 820 in which it is determined whether all of the data signals DS1, DS2, ... DSn (FIG. 4-(c)) have been received. If the result is "NO", the processing from Step 815 to Step 820 is repeated. On the other hand, if the result is "YES", the ACK signal is produced and outputted from this master unit to the signal line 110 (Step 821), and the processing according to this procedure is terminated. The processing from Step 815 to Step 821 is the same as the asynchronous communication processing of Steps 702 to 706, 709 and 710.

Figure 9:
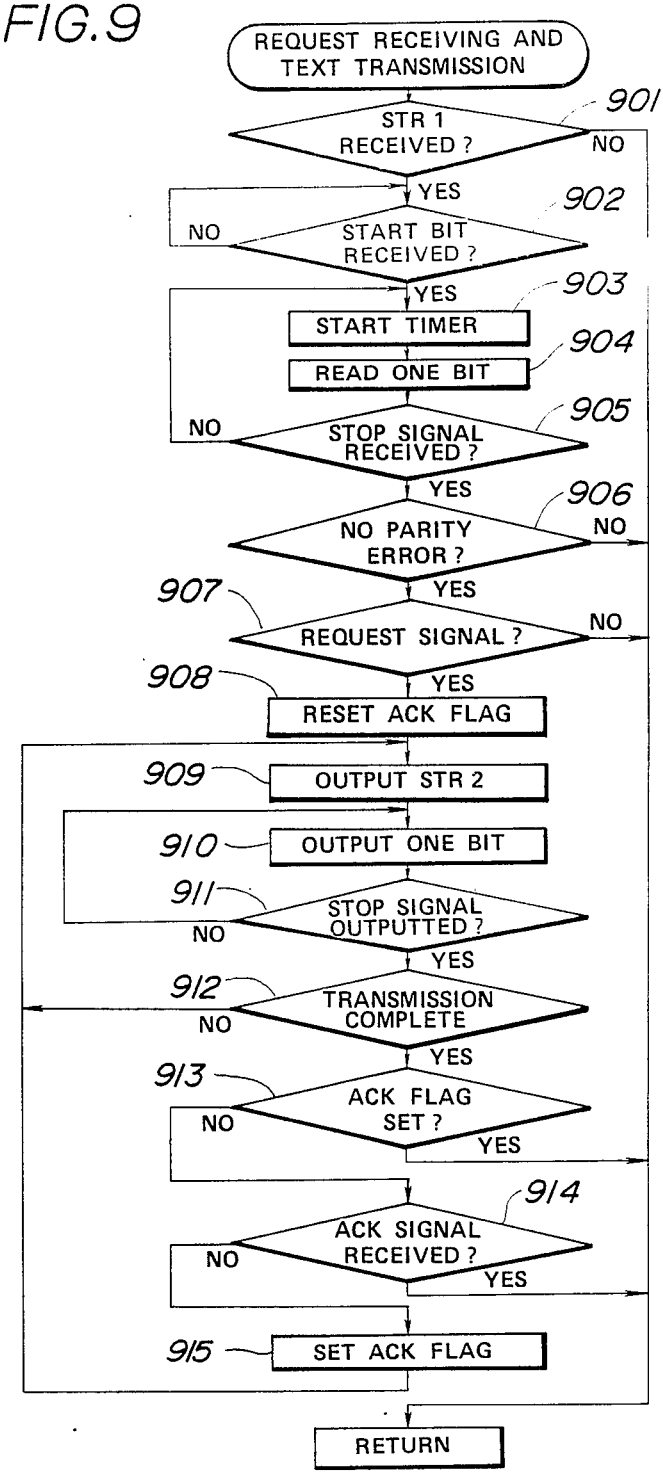
FIG. 9 is a flow chart of the synchronous communication in which the text data is transmitted in response to the request signal.

FIG. 9 shows the processing carried out in each of the slave units in response to the request signal fed from the master unit during the synchronous communication. First, in Step 901, it is determined whether the start signal STR1 of the request signal DS1 from the master unit is received by this slave unit. If the result is "NO", the processing according to this procedure is terminated. On the other hand, if the result is "YES", the processing proceeds to Step 902 in which it is determined whether the start bit SB is received. If the result is "NO", this processing is repeated until the start bit SB is detected.

In Step 902, if the result is "YES", start-stop timer means is started (Step 903) to set a predetermined time interval after which one bit of the data portion of the request signal is read into a memory associated with the microcomputer of this slave unit (Step 904). Then, in Step 905, it is determined whether all of the bits (16.5 bits) of the request signal DS1 have been received by this slave unit, that is to say, the stop signal STP is detected. If the result is "NO", the processing from Step 903 to Step 905 is repeated. In Step 905, if the result is "YES", the processing proceeds to Step 906 in which a parity check is carried out to determine whether there is no error in the data signal. If the result is "NO", the processing according to this procedure is terminated. On the other hand, in Step 906, if the result is "YES", the processing proceeds to Step 907. The processing from Step 901 to Step 906 is the same as the processing of the asynchronous communication from Step 701 to Step 706.

In Step 907, it is determined whether the request signal DS received by this slave unit contains the destination address data D-ADD which coincides with the address of this slave unit. If the result is "NO", the processing according to this procedure is terminated. On the other hand, if the result is "YES", the ACK flag is reset (Step 908), and the processing proceeds to Step 909 in which this slave unit is turned into a transmission mode.

In Step 909, the slave unit sends the start signal STR2, and then in Step 910, one bit of the remaining contents of the data signal DS is outputted onto the signal line 110. Then, in Step 911, it is determined whether all of the bits (12 bits) have been sent, that is to say, the stop signal STP is sent. If the result is "NO", the processing from Steps 910 and 911 is repeated until the stop signal STP is outputted.

In Step 911, if the result is "YES", the processing proceeds to Step 912 in which it is determined whether all of the data signals DS1, DS2, ... DSn have been outputted from this slave unit. If the result is "NO", the processing from Step 909 to Step 912 is repeated until the result becomes "YES".

In Step 912, if the result is "YES", the processing proceeds to Step 913 in which it is determined whether the ACK flag is in the set state. This ACK flag is set in Step 915 in a certain condition as later described. In Step 913, if the result is "NO", the processing proceeds to Step 914 in which it is determined whether an ACK signal is received by this slave unit. The ACK signal is produced and outputted onto the signal line 110 by the microprocessor of the source master unit transmitted the request signal DS1, when it properly received the data signals DS transmitted from this slave unit.

In Step 914, if the result is "NO", the processing proceeds to Step 915 in which the ACK flag is set, and the processing from Step 909 to Step 913 is performed again. On the other hand, in Step 914, if the result is "YES", the processing according to this procedure is terminated. The processing from Step 911 to Step 915 is the same as the processing from Step 613 to Step 617.

With this arrangement, the following advantages can be obtained:

(1) When the transmitting unit does not receive an ACK signal from the receiving unit, the transmitting unit re-transmits the same data signal. Thus, the receiving unit can receive the correct data from the transmitting unit even when the first transmission of the data signal by the transmitting unit results in error. The re-transmission is performed only once, so that the signal line 110 is prevented from being used repeatedly for such re-transmission of data signals by the same unit. Thus, the signal line 110 is used by the units efficiently.

(2) With respect to the signal line 110, the low-level signal is given a higher priority, and therefore when two units begin to transmit the data signals simultaneously, the unit whose data signal includes the first non-coincident bit of high level stops the transmission of the data signal. In this case, each data signal contains the destination address data D-ADD in its leading portion, as shown in FIGS. 4-(a) and 4-(b), so that the priority levels of the units can be determined based on the destination addresses D-ADD. In such a system, the smaller the address, the higher the priority level of the unit.

(3) Each receiving unit is so arranged that it outputs an acknowledge signal ACK when the data signal DS is received successfully. Thus, the transmitting unit can determine whether the transmission of the data signal DS was successful.

Although the above-described multiplex communication system thus has various advantages, it is not satisfactory in the following respects:

(a) Even when two units actually begin to output the data signals DS at the same time, the collision of the data signals can not be detected until their data portions following the start bits SB are outputted onto the signal line 110. Therefore, the unit which stops the communication based on the detection of data collision will lose much time for the useless processing. For example, in the case of FIG. 5, the unit 101 loses the time period from the beginning of the transmission of the data signal DS to the time $t_0$.

(b) Since the priority levels of the units (or nodes) are determined by the addresses assigned thereto, it is not easy to change their priority levels, and is impossible to freely change the priority levels irrespectively of the unit addresses.

Figure 10:
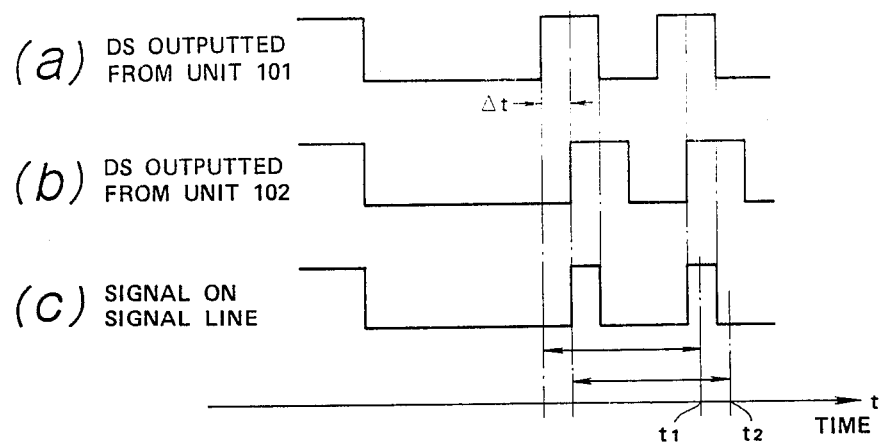
FIG. 10 is a time chart of the data signals from the units 101 and 102 whose clock signals are slightly different in interval from each other and the signal appearing on the signal line.

(c) Since the accuracies of the reference clock signal generators associated with the respective units differ from one another, the frequency of the sampling signals must be higher than the nominal frequency of the data signals DS. As a result, with the structure of the aforesaid multiplex communication system, it is difficult to transmit a large amount of data within a short time period. The reason for this is as follows:

FIGS. 10-(a) and 10-(b) show data signals DS simultaneously outputted from the units 101 and 102, respectively. It is assumed that the accuracy of the reference clock generator of the unit 101 is higher than that of the unit 102 so that the start bit of the data signal from the unit 102 is deviated from that from the unit 101 by $\Delta t$. Since the low level signal has a priority over the high level signal on the signal line 110, the signal appearing on the signal line 110 is as shown in FIG. 10-(c). The error $\Delta t$ is actually small but is exaggerated in FIG. 10 for better understanding. The responsiveness of the collision detection means of each unit is set such that the non-coincidence of the data signal on the signal line with the data signal outputted therefrom due to the difference of accuracy of the clock generators is not detected as a data collision. And therefore, in the case of FIG. 10, both data signals DS continue to be transmitted with the error or phase shift $\Delta t$. The destination unit for the data signals receives the signal of FIG. 10-(c) which contains positive-going pulses each having a shorter pulse width and a delayed leading edge. Reading (or sampling) of the bits of the data signal DS is effected at a predetermined time interval from the leading edge of the start bit, and therefore, a reading error may occur at time $t_2$ in FIG. 10-(c) (the first bit of the data signal DS must actually be read at time $t_1$). To avoid such a reading error, the frequency of the sampling signal for reading the bits must be increased. This means that the frequency of bits of the data signal must be lower than that of the sampling signal. As a result, it is impossible to transmit a large amount of data within a short period of time.

A modified multiplex communication system is provided to solve the above-described problems.

Figure 11:
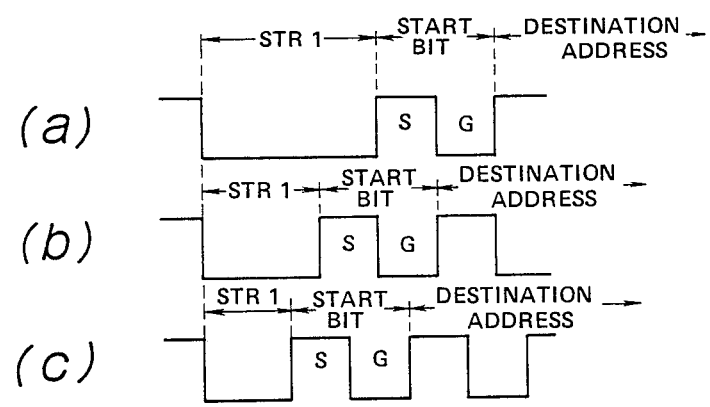
FIG. 11 is a time chart of the leading portions of the data signals in the modified multiplex communication system.

This modified multiplex communication system is identical in structure to that shown in FIG. 1, but the start signals STR1 of the data signals outputted from the respective units are different in time length from one another, as shown in FIGS. 11-(a) to 11-(c). The time length of the start signal STR1 of each of the units may alternatively determined in accordance with the destination units or in accordance with the kind of data to be transmitted. At all events, the time length of each start signal STR1 is set to a value greater than that of the start signal STR2 to avoid the confusion of the two signals STR1 and STR2.

Figure 12:
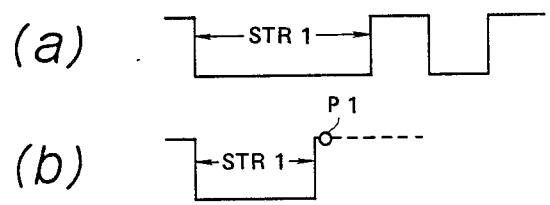
FIG. 12 is a time chart of the two data signals simultaneously outputted onto the signal line in the modified multiplex communication system.

In the case where the time length of the start signal STR1 is determined in accordance with the source units, a source unit outputting the longer start signal STR1 than another source unit preferentially obtains the right to transmit its data when the two source units begin to transmit their data simultaneously. For example, when the two data signals DS of FIGS. 11-(a) and 11-(b) begin to be transmitted at the same time, the unit which outputs the data signal DS of FIG. 11-(b) having the shorter start signal STR1 detects the non-coincidence of data earlier and stops the transmission of the data signal DS, as shown in FIG. 12. More specifically, immediately after the start signal STR1 of the data signal DS of FIG. 12-(b) ended, the start signal STR1 of the data signal DS of FIG. 12-(a) is still being outputted. And therefore, the signal on the signal line 110 is at the low level, so that the unit outputting the data signal of FIG. 12-(b) detects the non-coincidence of data at a monitoring point $P_1$.

It will be readily appreciated from FIGS. 5 and 12 that the loss of time of the unit which stops transmission of data due to a data collision is significantly decreased in this modified multiplex communication system.

In this modified multiplex communication system, the difference of time length between two start signals STR1 is normally set to a value which is sufficiently greater than the possible maximum error $\Delta t$ due to the difference of accuracy of the clock generators. Therefore, even when more than two units begin to transmit data signals simultaneously, only one unit, which outputs the longest start signal STR1, continues the transmission of data, and the other units stop their transmission of data. Thus, such a phase-shifted signal as that shown in FIG. 10-c) never appears on the signal line 110, so that the units are not subject to reading errors due to shifts of the data signals.

Figure 13:
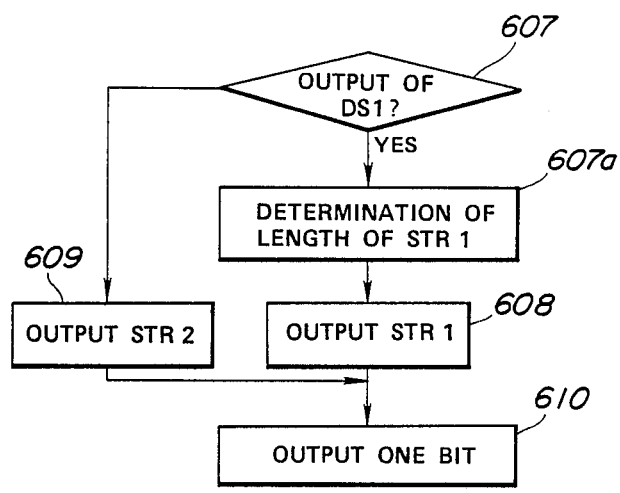
FIG. 13 is a flow chart of a portion of the procedure of the asynchronous transmission in the modified multiplex communication system.

In the modified multiplex communication system, the determination of the time length of the start signal STR1 is performed by the associated microcomputer as shown in FIG. 13.

FIG. 13 shows a portion of the procedure of an asynchronous transmission performed by this modified system, the other portion of the procedure being identical to that shown in FIG. 6. As shown, if the result of the determination at Step 607 is "YES", that is to say, the data signal DS to be outputted is DS1, the microcomputer of this transmitting unit determines the time length of the start Signal sTR1 at Step 607a, and then outputs the signal STR1 at Step 608. The determination of the time length of the signal STR1 is made in accordance with the address of this transmitting unit, the address of the unit to which this unit is going to transmit data, the kind of data to be transmitted by this unit, or other parameters.

This modified system is advantageous in the following respects:

(1) When a data collision occurs, the lower priority unit or node stops the transmission of data within the time period corresponding to the start signal, so that the loss of time of the lower priority unit is significantly reduced.

(2) The priority levels can be determined not only in accordance with their addresses but also in accordance with other parameters such as the destination addresses and the kind of the data to be transmitted. In addition, the change of such priority levels is easy and can be done quickly. Thus, the priority level can be changed in accordance with the conditions of the data processing by the unit concerned.

(3) The frequency of the bits of the data signal DS need not be much increased with respect to the frequency of the sampling signal for reading the bits, so that a large amount of data can be transmitted within a short time period.

With the aforesaid two embodiments, the idle state of the signal line 110 is detected by determining whether the voltage level of the signal line 110 is maintained at a high level for not less than a time period corresponding to 1.5 bits. Therefore, any units other than the unit which is presently transmitting data can not begin to transmit data until the transmission of data by the presently transmitting unit is completed.

Figure 14:
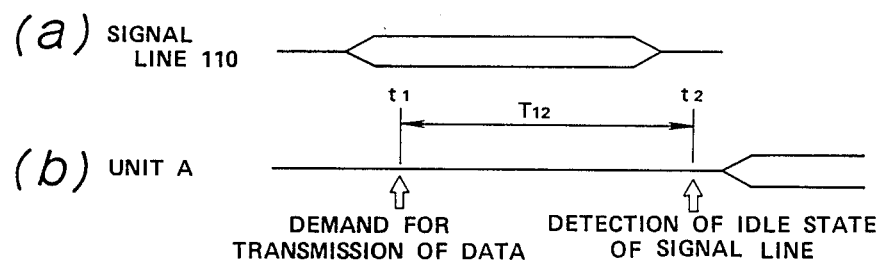
FIG. 14 is a time chart showing the relationship between the signal on the signal line and the output of data from one of the units in the multiplex communication system of FIG. 1.

It is assumed that when one of the units is transmitting data and, as a result, when the signal line 110 is busy as shown in FIG. 14-(a), a demand for transmission of data arises at time $t_1$ in one of the other units (unit A), as shown in FIG. 14-(b). In this case, the microcomputer of the unit A monitors the signal level of the signal line 110, and determines that the signal line 110 is busy if the signal level thereof is not kept at the high level for not less than 1.5-bit time. Thus, the unit A is brought into a waiting state. When the the transmission of data by the presently transmitting unit is completed and if the signal line 110 is kept at the high signal level for not less than 1.5-bit time, then the unit A detects that the signal line 110 is idle and begins to transmit the data at time $t_2$. As will be appreciated from the foregoing, the time period for which the unit A must wait is $T_{12}$ between the times $t_1$ and $t_2$, which is relatively long.

In some cases, it is preferable that even when one of the units is transmitting data another unit interrupts the transmission of data of the one unit and begins to transmit data if a demand for transmission of data arises in the another unit.

A further modified multiplex communication system enables one of the units to preferentially begin to transmit data even when another unit is presently transmitting data.

Figure 15:
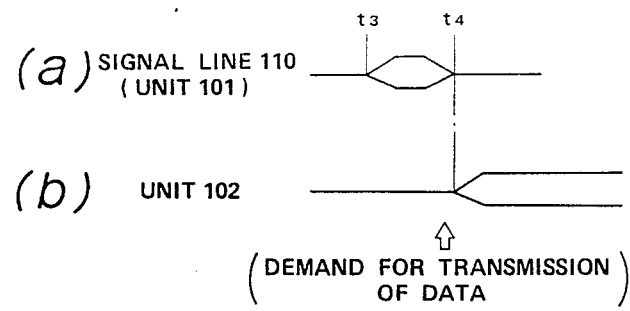
FIG. 15 is a time chart showing the relationship between the signal on the signal line and the output of data from one of the units in the further modified multiplex communication system.
Figure 16:
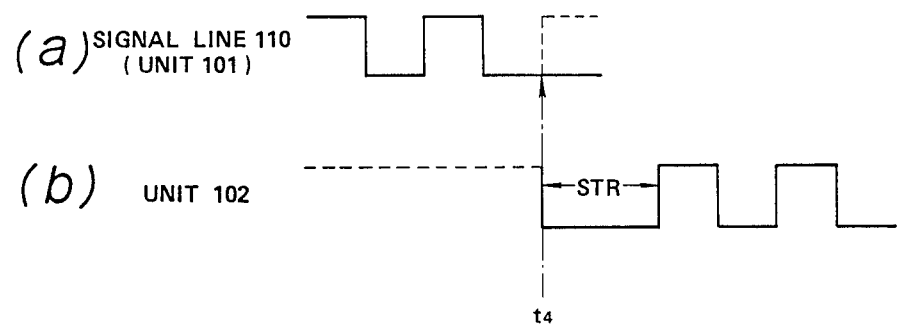
FIG. 16 is a time chart of the two data signals one of which begins to be outputted during the time when the other is being outputted in the further modified multiplex communication system.

FIG. 15 shows one example of data transmission performed in this further modified system. When the unit 101 begins to transmit data at time $t_3$, the signal line 110 is immediately brought into the busy state, as shown in FIG. 15-(a). Assuming that a demand for transmission of data arises in the unit 102 at time $t_4$ during the time when the signal line 110 is busy, the unit 102 first outputs a low-level start signal STR of more than one bit time (1.5-bit time in this embodiment) at the time $t_4$, as shown in FIG. 16-(b). As a result, the signal line 110 is held at the low level for at least 1.5-bit time from the time $t_4$. On the other hand, the data signal DS outputted from the unit 101 (FIG. 16-(a)) is never held at the low level for more than one bit time, so that the microcomputer of the unit 101 detects, without fail, non-coincidence of the data signal outputted therefrom with the data signal on the signal line 110. In the cas of FIG. 16, such non-coincidence is detected at the time $t_4$. The unit 101 therefore immediately stops the transmission of data, so that the signal line 110 becomes idle. On the other hand, the unit 102 outputs the remaining bits of the data signal DS following the start signal STR.

Figure 17:
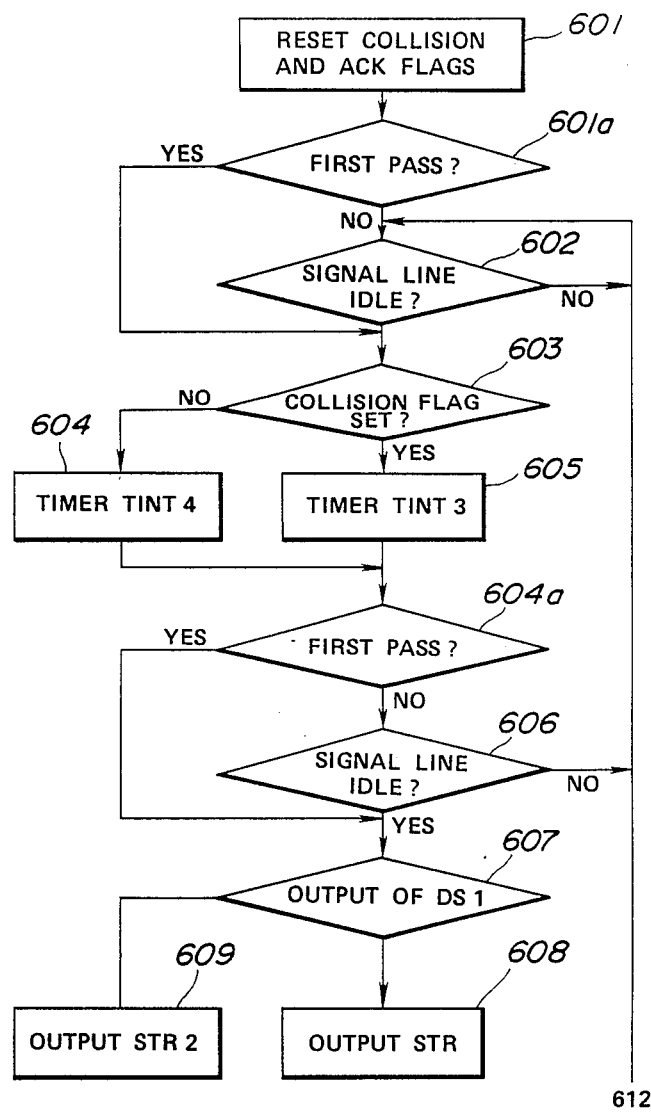
FIG. 17 is a flow chart of a portion of the procedure of the asynchronous transmission in the further modified multiplex communication system.

FIG. 17 shows the procedure of operation of the microcomputer of each of the units 101 and 102. This procedure differs from that shown in FIG. 6 only in the following respects:

Upon completion of the processing at Step 601, it is determined at Step 601a whether the processing is of the first pass. If the result is "YES", then the processing proceeds to Step 603. Similarly, before entering into Step 606, it is determined at Step 604a whether the processing is of the first pass, and if the result is "YES", the processing proceeds to Step 607. Thus, in the first pass of the processing, the determination as to whether the signal line 110 is idle is not made. Thus, with the arrangement of this further modified multiplex communication system, one of the units can begin to transmit data even when another of the units being transmitting data.

What is claimed is:

1. A multiplex communication system comprising:
a single signal line; and
a plurality of nodes connected to said signal line, each node being assigned a specific node address and having transmitting means connected to said signal line for outputting data in the form of a serial binary signal thereto and receiving means connected to said signal line for receiving data in the form of a serial binary signal therefrom, the data outputted from each transmitting means including source address data representative of the specific node address of a respective one of said nodes and destination address data representative of the specific node address of one of said nodes to which said data is to be transmitted, each of said nodes storing the data received from said signal line by a respective one of said receiving means when the destination address data included in the received data coincides with the node address thereof, said transmitting means of said nodes cooperating with said signal line to form a preferential circuit which provides on said signal line one of two binary signal levels defined to have a priority over the other binary signal level when at least one of said transmitting means outputs data onto said signal line at said one level, said preferential circuit isolating from said signal line those transmitting means simultaneously having output data at said other level, each of said nodes having collision detecting means for comparing bit by bit the data outputted from the transmitting means thereof with the data received by the receiving means thereof to detect a collision of data on which signal line when said two data differ from each other, each of said nodes causing the transmitting means thereof to stop outputting data when the collision of data is detected by the collision detecting means thereof.

2. A multiplex communication system according to claim 1, wherein said preferential circuit comprises a transistor whose emitter is connected to a first source of a voltage corresponding to said one of the two binary signal levels, a collector of said transistor being connected to sid signal line, which is connected to a second source of a voltage corresponding to said other of the two binary signal levels through a load, said transistor being driven in accordance with said data to be outputted from said each transmitting means.

3. A multiplex communication system according to claim 1, wherein said multiplex communication system is for use in a vehicle, said signal line being a wire harness for said vehicle.

4. A multiplex communication system according to claim 1, wherein each of said nodes comprises a microcomputer which controls the transmission of data by the transmitting means thereof and the reception of data by the receiving means thereof.

5. A multiplex communication system according to claim 1, wherein the serial binary signal outputted from each of said transmitting means of said nodes is a start-stop signal which begins with a start signal and ends with a stop signal.

6. A multiplex communication system comprising:
a single signal line;
a plurality of nodes connected to said signal line, each noded being assigned a specific node address and having transmitting means connected to said signal line for outputting data in the form of a serial binary signal thereto and receiving means connected to said signal line for receiving data in the form of a serial binary signal therefrom, the data outputted from each transmitting means including source address data representive of the specific node address of a respective one of said nodes and destination address data representative of the specific node address of one of said nodes to which said data is to be transmitted, each of said nodes storing the data received from said signal line by a respective one of said receiving means when the destination address data included in the received data coincides with the node address thereof, said transmitting means of said nodes cooperating with said signal line to form a preferential circuit which provides on said signal line one of two binary signal levels defined to have a priority over the other binary signal level when at least one of said transmitting means outputs data onto said signal line at said one level, said preferential circuit isolating from said signal line those transmitting means simultaneously having output data at said other level, each of said nodes having collision detecting means for comparing bit by bit the data outputted from the transmitting means thereof with the data received by the receiving means thereof to detect a collision of data on which signal line when said two data differ from each other, each of said nodes causing the transmitting means thereof to stop outputting data when the collison of data is detected by the collision detecting means thereof;
the serial binary signal outputted from each of said transmitting means of said nodes being a start-stop signal which egins with a start signal and ends with a stop signal; and
each of the start signals from said nodes being of said one of the two signal levels, the start signals from said nodes being different in time length from one another to assign different priority levels of transmission of data respectively to said nodes wherein the node outputting the start signal of a greater time length being assigned a higher priority level of data transmission.

7. A multiplex communication system according to claim 5, wherein each of said nodes further comprises means for monitoring a signal level on said signal line to determine, in accordance with a time period for which the signal line is held at said the other of the two signal levels, whether said signal line is idle, each of said transmitting means being allowed to output the data when the signal line is determined to be idle.

8. A multiplex communication system comprising:
a single signal line;
a plurality of nodes connected to said signal line, each noded being assigned a specific node address and having transmitting means connected to said signal line for outputting data in the form of a serial binary signal thereto and receiving means connected to said signal line for receiving data in the form of a serial binary signal therefrom, the data outputted from each transmitting means including source address data representative of the specific node address of a respective one of said nodes and destination address data representative of the specific node address of one of said nodes to which said data is to be transmitted, each of said nodes storing the data received from said signal line by a respective one of said receiving means when the destination address data included in the received data coincides with the node address thereof, said transmitting means of said nodes cooperating with said signal line to form a preferential circuit which provides on said signal line one of two binary signal levels defined to have a priority over the other binary signal level when at least one of said transmitting means outputs data onto said signal line at said one level, said preferential circuit isolating from said signal line those transmitting means simultaneously having output data at said other level, each of said nodes having collision detecting means for comparing bit by bit the data outputted from the transmitting means thereof with the data received by the receiving means thereof to detect a collision of data on which signal line when said two data differ from each other, each of said nodes causing the transmitting means thereof to stop outputting data when the collision of data is detected by the collision detecting means thereof;
the serial binary signal outputted from each of said transmitting means of said nodes being a start-stop signal which begins with a start signal and ends with a stop signal; and
each of the start signals of the serial binary signals from said nodes being of said one of the two signals levels and having a predetermined time length greater than a time period corresponding to a bit contained in the serial binary data, each of said transmitting means being allowed to output the data irrespectively of whether the signal line is busy.

9. A multiplex communication system comprising:
a single signal line; and
a plurality of nodes connected to said signal line, each node having transmitting means connected to said signal line for outputting data in the form of a serial binary signal thereto and receiving means connected to said signal line for receiving data in the form of a serial binary signal therefrom, each transmitting means of nodes cooperating with said signal line to form a preferential circuit which provides on said signal line one of two binary signal levels defined to have a priority over the other binary signal level when at least one of said transmitting means outputs data onto said signal line at said one level, said preferential circuit isolating from said signal line those transmitting means simultaneously having output data at said other level, each of said nodes having collision detecting means for comparing each of said nodes having collision detecting means for comparing bit by bit the data outputted from the transmitting means thereof with the data received by the receiving means thereto to detect a collision of data on which signal line when said two data differ from each other, each of said nodes causing the transmitting means thereof to stop outputting data when the collision of data is detected by the collision detecting means thereof.

* * * * *